March 16, 1965   N. FINCH   3,173,563
CROP-HANDLING VEHICLES

Filed Sept. 25, 1961   2 Sheets-Sheet 1

INVENTOR
NIGEL FINCH
BY
Irwin S. Thompson
ATTORNEY

March 16, 1965  N. FINCH  3,173,563
CROP-HANDLING VEHICLES

Filed Sept. 25, 1961  2 Sheets-Sheet 2

INVENTOR
NIGEL FINCH
BY
Irvin S. Thompson
ATTORNEY

United States Patent Office

3,173,563
Patented Mar. 16, 1965

3,173,563
CROP-HANDLING VEHICLES
Nigel Finch, Pinswell, Chedworth, Cheltenham, England
Filed Sept. 25, 1961, Ser. No. 140,562
Claims priority, application Great Britain, Sept. 29, 1960,
33,396/60
3 Claims. (Cl. 214—519)

The invention relates to a vehicle for handling cut forage crops, and is particularly concerned with such a vehicle in the form of a trailer arranged to be towed by an agricultural tractor and having conveying mechanisms which may be driven from the power-take-off shaft of the tractor.

It is the present practice to tow a forage harvester behind a tractor and for the harvester to discharge the cut forage into a trailer connected to and towed behind the harvester. When the trailer is full it is unhitched from the harvester and is towed to a silo where it is discharged. Conventional trailers for use with forage crops have conveying means driven from the towing tractor which discharge the forage from the bottom of the trailer. In order to deposit the forage into a silo the forage normally has to be elevated and this requires a separate elevator or blower with a separate power drive, normally a further tractor.

It is an object of the present invention to provide a trailer vehicle for handling cut forage and which may be filled in the field and then moved to a silo into which the vehicle may discharge directly by means of conveying mechanisms on the vehicle.

It is a further object of the invention to provide a trailer vehicle for handling cut forage crops comprising a body for containing a mass of forage, a conveyor disposed at the floor of the body for moving the forage towards opening means, a further conveyor to receive opened forage discharged by the opening means, and a blower to which the further conveyor delivers the forage and which acts to deliver the forage from the vehicle in an air blast.

The floor conveyor is preferably a slatted conveyor, conveniently comprising a series of spaced slats attached to and driven by endless chains. To prevent the cut forage crops falling through the conveyor to the ground if the slats are widely spaced a fixed floor member or structure may be positioned between the upper and lower conveyor runs.

The blower is preferably arranged to deliver the forage upwardly into a chute which is chosen to suit the silo or the like into which the vehicle has to discharge. This chute, or a lower section thereof, may be formed integrally with the blower casing and the latter is conveniently flanged for attachment of the chute or the upper section thereof.

The invention will now be further described with reference to the accompanying drawings which illustrate a trailer in accordance with the invention, and in which.

Figure 1:
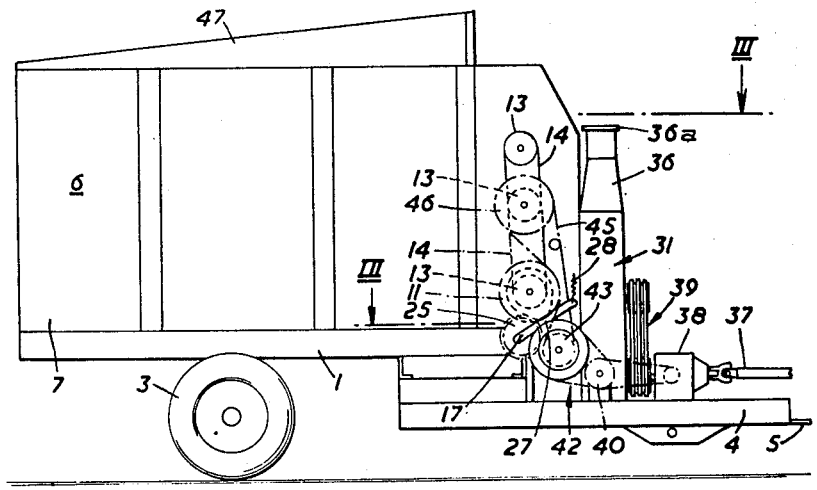
FIGURE 1 is a partly diagrammatic side view of the trailer.

The trailer has a rectangular frame 1 which is supported on an axle 2 and a pair of wheels 3 adjacent the rear end of the frame. A tow bar 4 in the form of a triangular frame extends from the forward end of the frame 1, being slightly underslung with respect to the latter frame so that its forward end is at a suitable level for connection to the drawbar of an agricultural tractor. At 5 the forward end of the frame 4 has means for attachment to the tractor.

Figure 4:
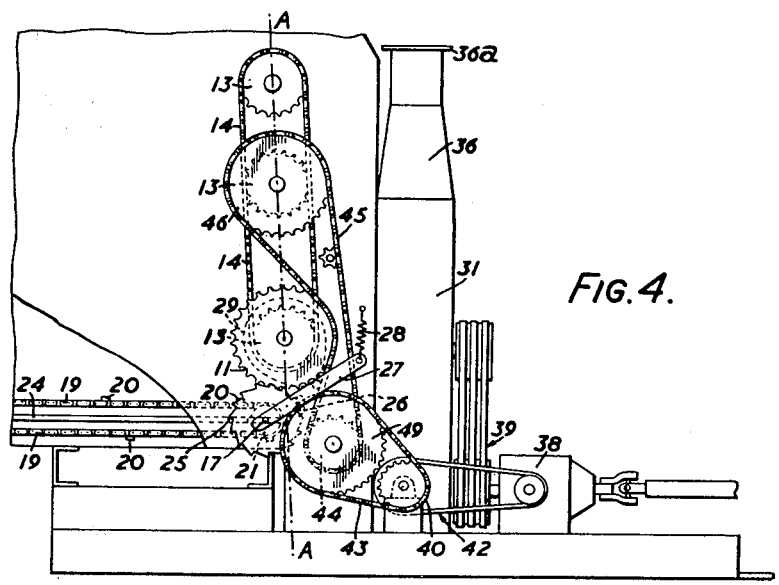
FIGURE 4 is a fragmentary detail view illustrating the drive arrangement of the trailer partly broken away.

A body 6 having upstanding sides 7 and back 8 but open at the front is mounted on the frame 1. Extending across the open front of the body 6 are three superposed and spaced cylindrical rollers 9 having their centres lying on a rearwardly inclined line (A—A in FIGURE 4) and each being provided with a plurality of spikes such as 10 arranged helically; the rollers 9 constitute opening members of opening or feed means for the mass of forage as hereinafter described.

Figure 5:
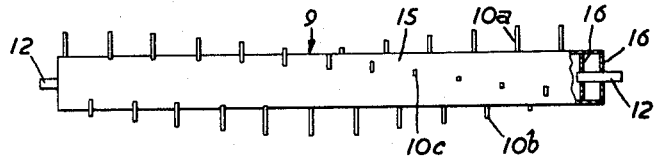
FIGURE 5 is a detail view of an opening member of the trailer.

Each opening roller 9 has coaxial stub shafts 12 respectively projecting from the ends of the roller and journalled in the sides 7 of the body 6. At the drive side, as seen in FIGURE 1, each stub shaft 12 has mounted thereon a driving sprocket 13. The sprockets 13 are interconnected by two drive chains 14, and the drive for all the rollers 9 is provided by a driven sprocket 11 mounted on the lowermost shaft 12 outwardly of the corresponding sprocket 13. As shown more particularly in FIGURE 5, each opening roller 9 comprises a cylindrical steel shell 15 mounted on the opposed coaxial stub shafts 12. In FIGURE 5 one of the rollers 9 is shown partly sectioned at one end to show the arrangement of the stub shafts 12. As will be seen from that figure, two spaced similar discs 16 are welded into each end of the cylinder 15 and have coaxial bores in which the corresponding stub shaft 12 is received and welded to the discs 16.

The helically arranged spikes 10 of each roller 9 project radially from the outer periphery of the cylinder 15, the spikes being in the form of short lengths of steel strip welded in position on the cylinder 15. Each roller 9 has three equiangular series of spikes 10, typical members of the series being shown at 10a, 10b and 10c in FIGURE 5. It will be seen from that figure that the three series of spikes 10 have a common helix angle which is so chosen that, starting from one end of the roller 9, the last spike of one series is aligned with the first spike of an adjacent series axially of the roller. In addition, as is also clearly shown in FIGURE 5, the spikes 10 of each series thereof are staggered axially of the roller 9 relatively to the other two series. The described formation of each roller 9, coupled with the relative arrangement of the three rollers, results in a very satisfactory opening action during operation of the opening means.

A conveyor at the floor of the body 6 is arranged to move the forage towards the opening rollers 9 from the body of the trailer. The conveyor is arranged in two sections arranged side by side longitudinally of the vehicle, both conveyor sections utilising a common drive shaft 17. Each conveyor section comprises a pair of spaced parallel endless chains, 18, 18 or 19, 19, between which are fixed a spaced series of slats such as 20. The chains 18 and 19 are mounted on front sprockets 21 which are themselves mounted on the drive shaft 17, and at the rear end the chains 18 and 19 are mounted on sprockets such as 22 mounted on an idler shaft 23.

Figure 2:
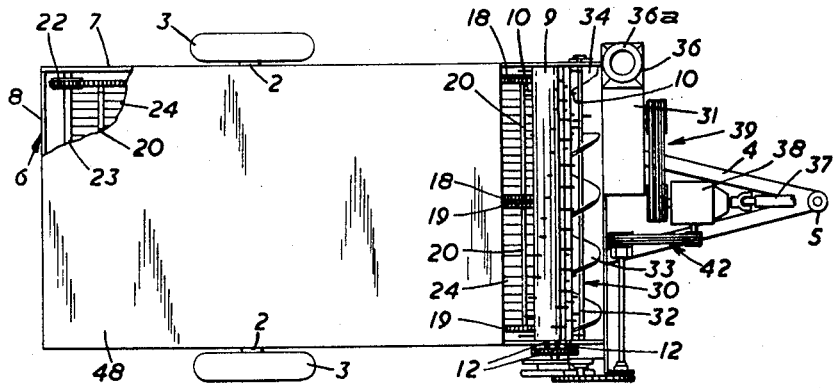
FIGURE 2 is a plan view thereof, partly cut away to shown internal detail.
Figure 3:
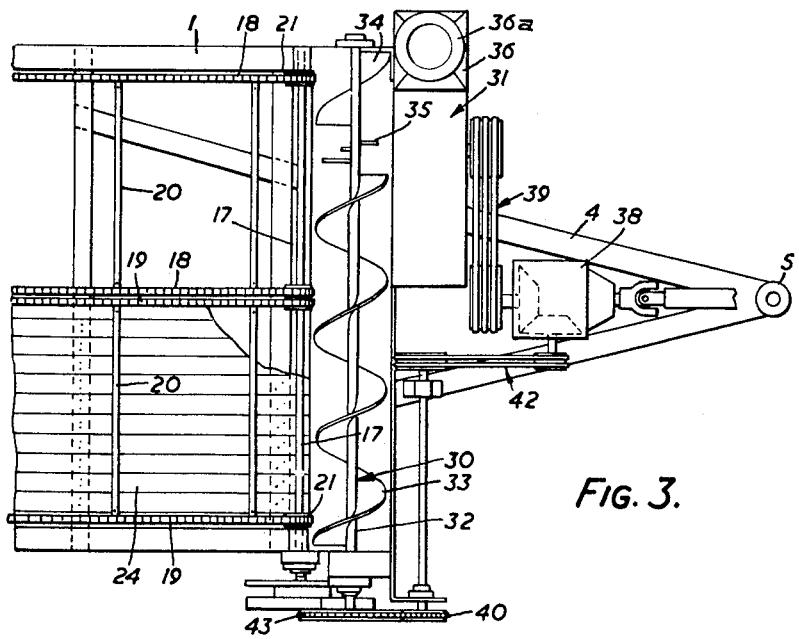
FIGURE 3 is a fragmentary sectional view generally on the line III—III in FIGURE 1.

As will be seen from the drawings the slats 20 of the slatted conveyor are widely spaced, and to prevent the forage falling through the conveyor to the ground a fixed floor structure 24 is positioned between the upper and lower conveyor runs. As shown in FIGURES 2 and 3, this floor structure is of timber boarded construction. In FIGURE 3 some of the floor structure 24 is shown cut away to illustrate more clearly the construction of the frames 1 and 4 and the arrangement of the drive shaft 17.

In use the floor conveyor is driven intermittently by a pawl and ratchet mechanism. As shown more particularly in FIGURE 4, the ratchet wheel 25 is mounted on the conveyor drive shaft 17 at the drive side of the vehicle, and the ratchet 25 is operated to advance the conveyor by means of a pawl 26. The pawl 26 is mounted on a pawl carrier in the form of a swing arm 27 pivoted adjacent one end on the shaft 17 and attached adjacent the other end to a return spring 28. Attached to the inner face of the driven sprocket 11 is a cam 29 with a single lobe which produces a complete operative movement of the pawl carrier 27 once during each revolution of the cam 29 and hence during each revolution of the opening rollers 9. This pawl and ratchet operation of the conveyor advances the latter stepwise at a rate which provides a satisfactory feed to the opening rollers 9.

At the front of the body 6 and below the opening rollers 9 is a further conveyor in the form of a double Archimedean screw 30 extending across the front of the trailer and arranged to deliver opened forage to a centrifugal blower 31 mounted at the front of the body 6. The screw 30 comprises a shaft 32 on which are mounted two opposed helical vanes 33 and 34. In use the vanes 33 and 34 feed the opened forage to an intermediate position along the screw between the inner ends of the vanes 33 and 34. The blower 31 is arranged so that said intermediate position along the screw 30 communicates directly with the inlet of the blower 31, and at this intermediate position the shaft 32 has a number of radially projecting spikes 35 which have a final opening action on the forage.

The Archimedean screw 30 is arranged forwardly of the floor conveyor and the lowermost opening roller 9, and the arrangement is such that forage conveyed forwardly within the trailer cannot reach the screw 30 directly but is first subjected to the opening action of that opening roller. The blower 31 has an upwardly extending discharge pipe 36 forming a lower discharge chute section which is flanged at the upper end at 36a to enable a suitable upper discharge chute section to be bolted in position. This enables the upper discharge chute section, which is not illustrated, to be chosen to suit the silo or like installation into which it is desired the vehicle should discharge.

The floor conveyor 18, 19, 20, the screw conveyor 30, the blower 31 and the opening rollers 9 are all driven from a single power input shaft 37 which is arranged to be connected to the power-take-off shaft of the towing tractor. The input shaft 37, as shown more particularly in FIGURE 4, drives a reduction gearbox 38 mounted on the triangular frame 4. The gearbox 38 has two outputs, a rear output which drives the blower 31 through a multiple belt drive 39 and a drive side output which drives an intermediate sprocket set 40 through a belt drive 42. The sprocket set 40 is coupled by a chain 43 to a driven sprocket 49 mounted on the drive end of the screw shaft 32 to provide a drive for the screw conveyor 30.

A driving sprocket 44 mounted on the shaft 32, inwardly of the driven sprocket 43, is coupled by a chain 45 to an idler sprocket 46 mounted on the drive end stub shaft 12 of the middle opening roller 9. Between the sprockets 44 and 46 one run of the chain 45 engages the sprocket 11 to provide the drive for the latter in a manner which rotates the screw conveyor 30 and the opening rollers 9 in opposite directions, as is necessary with the illustrated form of the vanes 34 and 35.

The body 6 has triangular side members 47 at the top thereof, the rear inclined edges of the side members 47 being interconnected by a top plate 48 which prevents forage delivered by a harvester to the trailer from being blown backwardly over the trailer. The side members 47 and top plate 48 terminate short of the front of the trailer to provide a gap above the uppermost opening roller 9 through which the forage can be delivered into the trailer.

In use, the trailer is towed behind the tractor and harvester in the normal way and cut forage is delivered to the trailer between the front edges of the side members 47 above the uppermost opening roller 9. Some of the forage impinges upon the top plate 48 and is deflected thereby into the body of the trailer. When the trailer is full, it is unhitched from the harvester and is connected to a tractor the power-take-off-shaft of which is connected to the input shaft 37 as already described.

When the tractor has pulled the trailer to the silo installation into which the forage is to be discharged, the input shaft 37 is driven and the trailer discharges the forage through a suitable chute section connected to the flange 36a as follows:

The forage is moved forwardly by the floor conveyor slats 20 in an intermittent manner, is entrained by the opening rollers 9 which rotate in the same direction and the spikes 10 of which open the mass of forage and deliver it to the double screw conveyor 30 at the front of the trailer; the screw conveyor 30 conveys the forage to the blower 31 and the latter propels the forage in an air blast along the chute and into the silo.

It will be seen that efficient continuous forage harvesting can be obtained with two tractors, two trailers embodying the invention and a forage harvester. One tractor may do the harvesting and fill one of the trailers while the other tractor tows the trailer to and from the silo and drives the conveying mechanism of the trailer when the latter is at the silo. This represents a considerable saving of equipment over the present arrangement in which a further prime mover and elevator have to be provided to elevate the forage delivered from conventional trailers and to deliver it into the silo.

I claim:

1. A trailer for transporting and conveying forage crops, comprising
   a vehicle body having means for attachment to a tractor at the front end thereof,
   an endless longitudinal conveyor positioned at the floor of the trailer and movable to convey the crops towards the front of the trailer,
   a transverse screw conveyor at the lower front portion of the trailer, having end sections adapted to feed inwards to an intermediate position,
   feed means comprising at least two parallel rotary members having transversely projecting spikes, mounted on parallel transverse axes at the front of the trailer above the front end of said longitudinal conveyor to assist in separating the material and feeding same to said transverse conveyor,
   a rotary blower mounted forwardly of said transverse conveyor on a front-to-rear axis and having an inlet which is aligned with said intermediate position of said transverse conveyor, at least the major part of said blower being confined between the longitudinal vertical planes containing the longitudinal sides of the vehicle,
   a longitudinal drive shaft at the front of said vehicle, having coupling means for connection to a power take-off shaft of a tractor,
   and transmission mechanism interconnecting said drive shaft with said blower, said transverse and longitudinal conveyors, and said feed means.

2. A trailer as claimed in claim 1, in which the rotary members of the feed means are mounted on parallel transverse axes lying substantially vertically one above the other.

3. A trailer as claimed in claim 1, in which said transverse conveyor is provided with a plurality of spikes adjacent said intermediate section thereof, to assist in separating and feeding the material to the inlet of said blower.

References Cited in the file of this patent
UNITED STATES PATENTS

| | | |
|---|---|---|
| 2,743,832 | Kappelmann | May 1, 1956 |
| 2,822,946 | Van Drisse | Feb. 11, 1958 |
| 2,865,521 | Fisher et al. | Dec. 23, 1958 |
| 2,900,069 | Manns et al. | Aug. 18, 1959 |
| 2,931,529 | Osterhaus | Apr. 5, 1960 |
| 3,047,173 | Raney | July 31, 1962 |
| 3,047,174 | Kasten | July 31, 1962 |
| 3,063,723 | Toft | Nov. 13, 1962 |